United States Patent
Van Horne, III et al.

(10) Patent No.: US 7,337,224 B1
(45) Date of Patent: Feb. 26, 2008

(54) METHOD AND APPARATUS PROVIDING POLICY-BASED DETERMINATION OF NETWORK ADDRESSES

(75) Inventors: Edwin J. Van Horne, III, San Diego, CA (US); Matthew King, Eversley Hamshire (GB); Chaim Bendelac, Kfar Saba (IL)

(73) Assignee: Cisco Technology, Inc., San Jose, CA (US)

( * ) Notice: Subject to any disclaimer, the term of this patent is extended or adjusted under 35 U.S.C. 154(b) by 758 days.

(21) Appl. No.: 10/280,545

(22) Filed: Oct. 24, 2002

(51) Int. Cl.
*G06F 15/173* (2006.01)
*G06F 17/00* (2006.01)

(52) U.S. Cl. .................. 709/225; 709/223; 709/224; 709/226; 726/1

(58) Field of Classification Search ........ 709/223–226; 726/1
See application file for complete search history.

(56) References Cited

U.S. PATENT DOCUMENTS

| | | | |
|---|---|---|---|
| 5,922,074 A * | 7/1999 | Richard et al. ............. | 726/21 |
| 5,941,947 A * | 8/1999 | Brown et al. ............... | 709/225 |
| 6,308,273 B1 * | 10/2001 | Goertzel et al. ............ | 726/2 |
| 6,393,484 B1 * | 5/2002 | Massarani .................. | 709/227 |
| 6,556,574 B1 * | 4/2003 | Pearce et al. .............. | 709/242 |
| 6,657,991 B1 * | 12/2003 | Akgun et al. ............... | 709/218 |
| 6,792,474 B1 * | 9/2004 | Hopprich et al. ........... | 709/245 |
| 6,952,428 B1 * | 10/2005 | Necka et al. ............... | 709/220 |
| 2002/0013844 A1 * | 1/2002 | Garrett et al. ............. | 709/225 |
| 2003/0210671 A1 * | 11/2003 | Eglin ........................ | 370/338 |
| 2004/0022242 A1 * | 2/2004 | Bhogal et al. .............. | 370/389 |
| 2004/0047320 A1 * | 3/2004 | Eglin ........................ | 370/338 |
| 2004/0128367 A1 * | 7/2004 | Piercy et al. ............... | 709/220 |

OTHER PUBLICATIONS

Fry, Patrick H., & Knight, J. (1997). A Caching DHCP Relay Agent. Troy, New York: Rensselaer Polytechnic Institute.*
Carl-Mitchell, Smoot & Quarterman, J. Using ARP to Implement Transparent Subnet Gateways. RFC 1027. Oct. 1987.*
Patrick, M. DHCP Relay Agent Information Option. RFC 3046, Jan. 2001.*
The Microsoft Computer Didionary. 5th ed. Redmond, WA: Microsoft Press. May 1, 2002.*
S. Alexander et al., "DHCP Options and BOOTP Vendor Extensions," Mar. 1997, pp. 1-34.
R. Droms, "Dynamic Host Configuration Protocol," Mar. 1997, pp. 1-45.

* cited by examiner

*Primary Examiner*—Glenton B. Burgess
*Assistant Examiner*—Brendan Y. Higa
(74) *Attorney, Agent, or Firm*—Hickman Palermo Truong & Becker LLP (57) ABSTRACT

A method is disclosed for policy-based determination of a network address for a client in a network. A request for a network address is received from a client. A policy response is received that identifies a scope of network addresses for the client. A request source address value in the client request is modified, based on the policy response. The modified client request is sent to a server that can assign network addresses within the identified scope. A network address for the client is received, which has been assigned by the server within the identified scope. The network address is provided to the client. A specific embodiment modifies a "giaddr" field value in a DHCP request, before relaying the request to a DHCP server, based on a policy decision that specifies a scope to be used for the network address of the client.

36 Claims, 7 Drawing Sheets

METHOD AND APPARATUS PROVIDING POLICY-BASED DETERMINATION OF NETWORK ADDRESSES

FIELD OF THE INVENTION

The present invention generally relates to networked data processing. The invention relates more specifically to a method and apparatus providing policy-based determination of network addresses.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

As the number of network hosts increases, fewer and fewer network addresses are available to uniquely identify new hosts. For example, in the context of the Internet, host network addresses conforming to version 4 of the Internet Protocol ("IPv4 addresses") are an increasingly scarce commodity, and it is desirable to conserve them.

In one approach, conservation is implemented by assigning private, reusable IP addresses to hosts in a local area network that are logically located behind a network device, such as a router, that performs network address translation (NAT). However, NAT devices often interfere with the correct operation of some higher-level protocols that encode IP information above the network layer, such as File Transfer Protocol (FTP). Thus, for a particular network, a first subset of clients may need to interact with external FTP servers, and therefore may need public routable addresses, whereas a second subset of clients may suffice with private addresses that are known behind a NAT device but that are not publicly routable. Managing these different needs is a challenge if static network addresses are assigned, but the needs of a particular client then change.

Some networks use Dynamic Host Control Protocol (DHCP) for assigning network addresses. DHCP is defined in IETF Request for Comments (RFC) 2131 and in RFC 2132. In networks with DHCP, the conventional solution to the problem of address scarcity is to create DHCP reservations for clients requiring public addresses, and to assign private address leases through standard DHCP mechanisms. This solution is problematic for several reasons. Reservations do not have expiration times, so it is difficult to recover public IP addresses for re-use. Programmatic interfaces to DHCP servers are proprietary or non-existent, complicating the problem of managing the reservations.

Conventional DHCP operation is performed in a network having one or more DHCP servers, which are hosted at arbitrary locations in the network, and one or more DHCP clients that are hosted at respective client devices in the network, such as workstations or PCs. Not all the DHCP servers may be able to provide a network address to a particular client. Generally, each DHCP server is responsible for assigning network addresses within specified ranges associated with "scopes" of clients. If a DHCP server receives a request from a gateway that is coupled to clients that are outside the scopes configured on that DHCP server, or if there are no addresses available within the scope that the DHCP server selects for the request, then that DHCP server does not respond to the request. DHCP servers usually determine whether a received request should be offered an IP address within a particular scope by examining the value of the "giaddr" field.

A DHCP relay agent may be communicatively coupled to or hosted by a gateway, which is often the default gateway with respect to a particular client device. When a client device needs a network address, such as upon boot-up or restart, the client device broadcasts a DHCP Discover message, which is received by its DHCP relay agent. The relay agent forwards the Discover message to one or more DHCP servers that can potentially provide addresses for the client, and provides the network address of interface on which the relay received the request in the gateway address ("giaddr") field of the forwarded message.

One or more of the DHCP servers responsible for the scope associated with the gateway and client may respond with Offer messages that offer a lease for an available network address to the client. The relay agent relays each offer to the client. The client selects one of the offers and requests it from the DHCP server that offered it, via the relay agent. If the DHCP Server positively acknowledges this request, the client can determine that it has succeeded in obtaining the associated address until expiration of the lease.

One past variation on this approach involves a smart-relay function. In smart relaying, primary and secondary address values are configured on the interface of a DHCP relay agent through which the agent receives broadcast DHCP requests. If a client cannot get a lease when the primary address is used as the "giaddr" field value, then the DHCP relay agent sends another DHCP request that uses the secondary interface address value for the "giaddr" field. Thus, the smart-relay function provides an overflow feature, which allows clients to get leases from the overflow scope if no leases are available on the primary scope. No policy decision-making is involved. The smart-relay function is most useful in networks having a large number of clients where it is appropriate to shift to a secondary scope if the first is unavailable.

Another approach to policy-based scope selection uses the contents of DHCP Option 82, which is inserted by the DHCP relay agent, to override the value of the "giaddr" field for the purpose of scope assignment. DHCP Option 82 is described in IETF RFC 3046. This is a viable approach when the following three conditions hold: 1) the DHCP relay agent has the knowledge of, for example, the user identity to insert in Option 82 to drive the scope selection; 2) the DHCP server supports scope determination through the contents of Option 82 instead of the value of "giaddr"; and 3) the DHCP server has programmatic access to the source of lease assignment policy decisions. In many cases, however, one or more of these three conditions are not met and another approach is indicated.

Based on the foregoing, there is a clear need for an improved way to provide address conservation in a network.

There is a specific need for a way to assign network addresses from a plurality of different scopes, based on external policy decisions. For example, a network administrator may wish to enforce a policy that assigns private addresses whenever possible, and public addresses only when necessary.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing policy-based determination of network addresses is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Implementation Mechanisms - Hardware Overview |
| 4.0 | Extensions and Alternatives |

1.0 General Overview

The needs identified in the foregoing Background, and other needs and objects that will become apparent for the following description, are achieved in the present invention, which comprises, in one aspect, a method for policy-based determination of a network address for a client in a network. A request for a network address is received from a client. A policy response is received that identifies a scope of network addresses for the client. A gateway interface address value in the client request is modified, based on the policy response. The modified client request is sent to a server that can assign network addresses within the identified scope, based on the gateway interface address value. A network address for the client is received, which has been assigned by the server within the identified scope. The network address is provided to the client.

A specific embodiment modifies a "giaddr" field value in a DHCP request, before relaying the request to a DHCP server, based on a policy decision that specifies a scope to be used for the network address of the client. For example, an embodiment provides a method of dynamically assigning an Internet Protocol (IP) address to a client that participates in a network having a DHCP relay agent and a Dynamic Host Control Protocol (DHCP) server. A DHCP Discover message is received from the client. A policy request message is sent to a policy server in the network, wherein the policy request message includes a media access control (MAC) address of the client. A policy response is received from the policy server; the policy response includes an address scope identifier. A gateway interface address ("giaddr") value in the client request is modified based on the address scope identifier. The modified client request is forwarded to the DHCP server. A DHCP offer message is received from the DHCP server, and offers an address that is within a scope associated with the address scope indicator. The offer message is forwarded to the client.

In one approach, based on input from a policy server, a gateway manipulates the "giaddr" field of DHCP requests to cause the DHCP server to assign a lease from the desired scope. Under control of a policy server, the gateway decides, based on the Media Access Control (MAC) address of the client and the interface to which it is attached, which "giaddr" value to write in the DHCP request. The term "gateway," in this context, is an example name of a hosting device for the logic described herein, and may comprise the type of device now known as a gateway, a DHCP relay agent, or any other device that performs the functions described herein. The DHCP server, which is unmodified and uses standard DHCP logic, assigns a lease from the scope desired by the policy, based on the value of "giaddr." Thus, policy information essentially forces the DHCP server to assign network addresses from a specified scope.

Unlike prior approaches, this solution does not require customization of the DHCP server; only the DHCP relay agent or gateway is modified. The messaging between the DHCP relay agent and DHCP server follows the DHCP standard, and the DHCP server cannot distinguish the messages from those generated by a standard DHCP relay agent. Also, no direct communication is required between the policy server and the DHCP server, for which no standard exists. Further, all the addresses are assigned as DHCP leases. Therefore, all addresses can be recovered by the DHCP server by refusing to renew the lease. This is not possible with a system based partially on DHCP reservations, which do not expire.

In other aspects, the invention encompasses a computer apparatus, a computer readable medium, and a carrier wave configured to carry out the foregoing steps.

2.0 Structural and Functional Overview

Figure 1A:
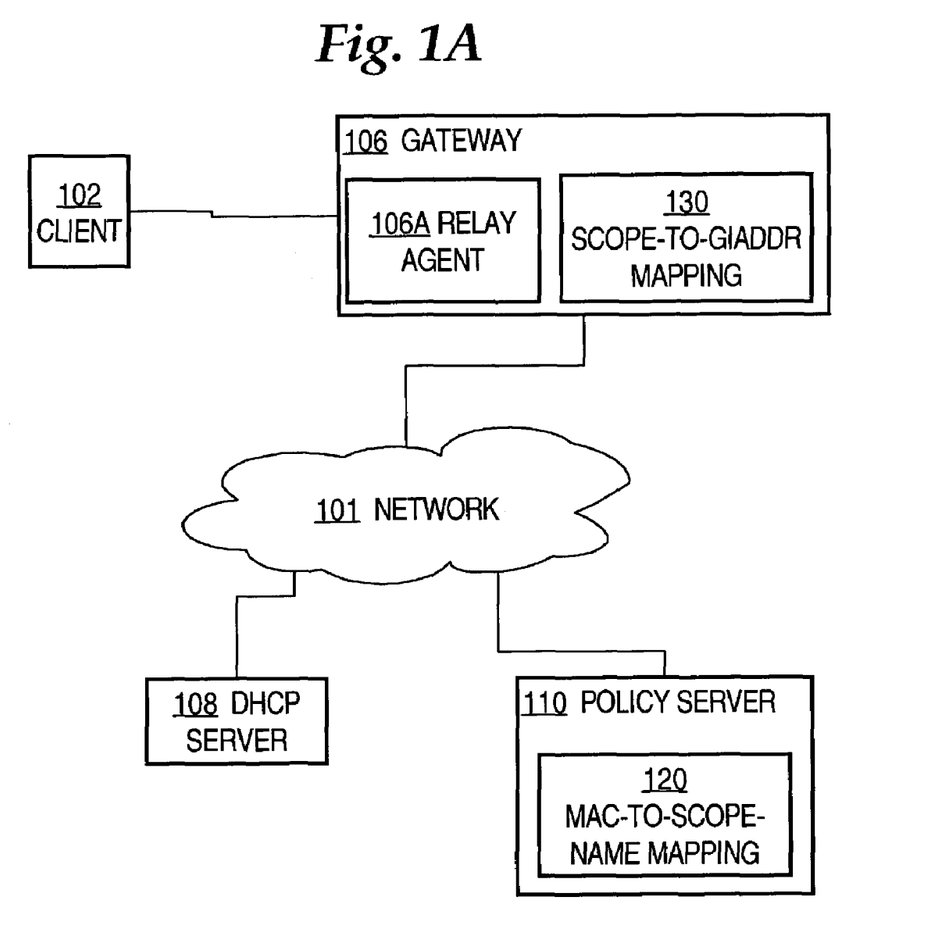
FIG. 1A is a block diagram that illustrates an overview of a system in which policy-based determination of network addresses may be performed.

FIG. 1A is a block diagram that illustrates an overview of a system in which policy-based determination of network addresses may be performed. A client 102 and a gateway 106 incorporating a DHCP relay agent 106A are communicatively coupled to a local network 103. In this context, the term "gateway" refers to any device or group of devices that are capable of intercepting and modifying DHCP messages exchanged between the DHCP relay agent an dhte DHCP server; this includes, but is not limited to, devices conventionally termed "gateways." The local network 103 is coupled through the gateway 106 to a wide area network or internetwork 101. Client 102 is a computer or other device through which an end-user accesses network services.

Gateway 106 is a first hop router or other data plane element that implements policy enforcement point functions. In one embodiment, gateway 106 is based on Cisco Service Selection Gateway technology from Cisco Systems, Inc. Gateway 106 may include a DHCP relay agent 106A for processing messages that conform to Dynamic Host Control Protocol. For example, DHCP relay agent 106A is responsible to act as proxy for DHCP server 108, described below, and to create routable packets for communication between client 102 and DHCP server 108. The inside interface of gateway 106 is multinet with multiple addresses, one for each subnet that contains clients 102.

A DHCP server 108 and a policy server 110 are communicatively coupled to network 101. Such servers may be remotely located with respect to client 102. The policy server 110 may reside within the DHCP relay agent 106A or outside it. DHCP Server 108 functions to assign DHCP leases in conformance with RFC 2131 and RFC 2132. The use of a policy server 110 is illustrated as an example; however, a policy function may be provided using any suitable means, mechanism, or process, and the policy function may be located anywhere in the network.

Each gateway 106 may be identified by one or more gateway interface addresses. A gateway interface address value is carried in a "giaddr" field of a DHCP message. A gateway interface address value identifies an interface of a gateway that communicates with a switch. Normally there is one "giaddr" value associated with all clients that are coupled to the same gateway. Most DHCP servers, in conventional operation, use the value of the "giaddr" field in a DHCP Request message to select a scope from which an IP address is offered to a client. For example, the Microsoft DHCP server performs scope selection based on "giaddr" field values.

Policy server 110 is a control plane element that provides policy-based decisions that may be used to determine network addresses, and other services. In one specific embodiment, policy server 110 provides a web service for HTTP-based authentication, a RADIUS proxy to support applying policy to clients authenticating via layer 2 (L2) protocols, and northbound interfaces to operation support systems (OSS).

For purposes of illustrating a clear example, FIG. 1A is greatly simplified, but a practical embodiment may include numerous other elements. For example, there may be any number of clients and DHCP servers.

In one embodiment, selection of a network address scope is supported through use of mappings, stored at the policy server 110 and gateway 106, that relate client control addresses, scope identifiers, and request source addresses. As shown in FIG. 1A, gateway 106 maintains a mapping 130 that relates scope identifiers to request source addresses, such as "giaddr" values. Policy server 110 maintains a mapping 120 that relates client control addresses, such as MAC addresses, to scope identifiers or names. Mapping 120 allows policy server 110 to refer to the scope by name without direct knowledge of the "giaddr" associated with the scope, but use of mapping 120 is not essential. The mapping 130 simplifies configuration of the policy server 110. Mapping 130 is not needed if the MAC to scope name mapping 120 is replaced with a MAC to "giaddr" mapping on the policy server 110.

Figure 1B:
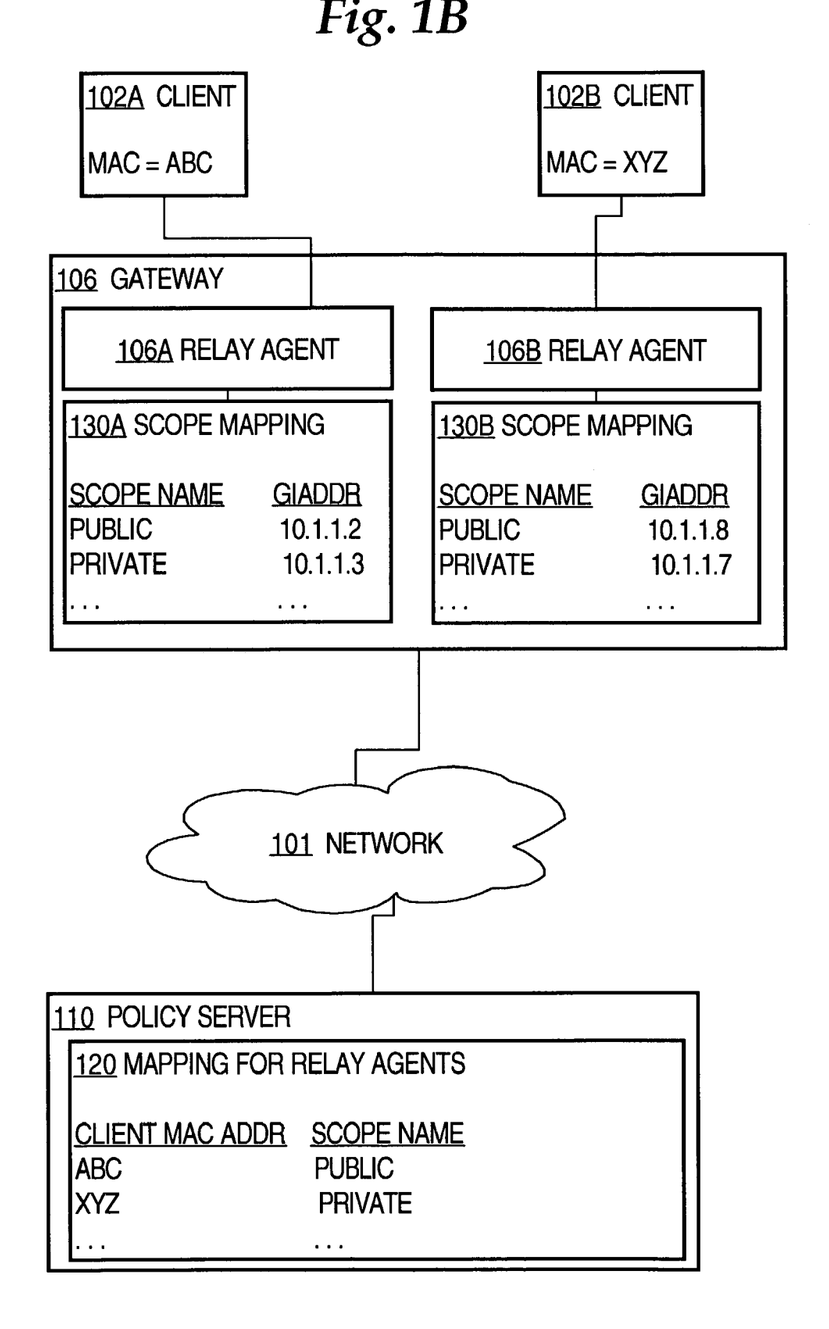
FIG. 1B is a block diagram of mappings stored in a policy server.

FIG. 1B is a block diagram of one embodiment of mappings that may be stored in a policy server. In this embodiment, the policy server interoperates with a plurality of DHCP relay agents that are associated with different gateways, which in turn are associated with different groups of clients.

In FIG. 1B, policy server 110 comprises a mapping 120 that contains entries associated with one of a plurality of gateways and DHCP relay agents 106A, 106B (collectively referred to herein as "gateway 106"). Mapping 120 comprises a first column that stores client control addresses and a second column that stores associated scope identifiers. The client control addresses may be MAC addresses, and the scope identifiers may be abstract scope names. The use of abstract scope names allows the policy server 110 to refer to the scopes by their function rather than their 'giaddr'. Use of the mapping 120 is described further below.

Figure 1C:
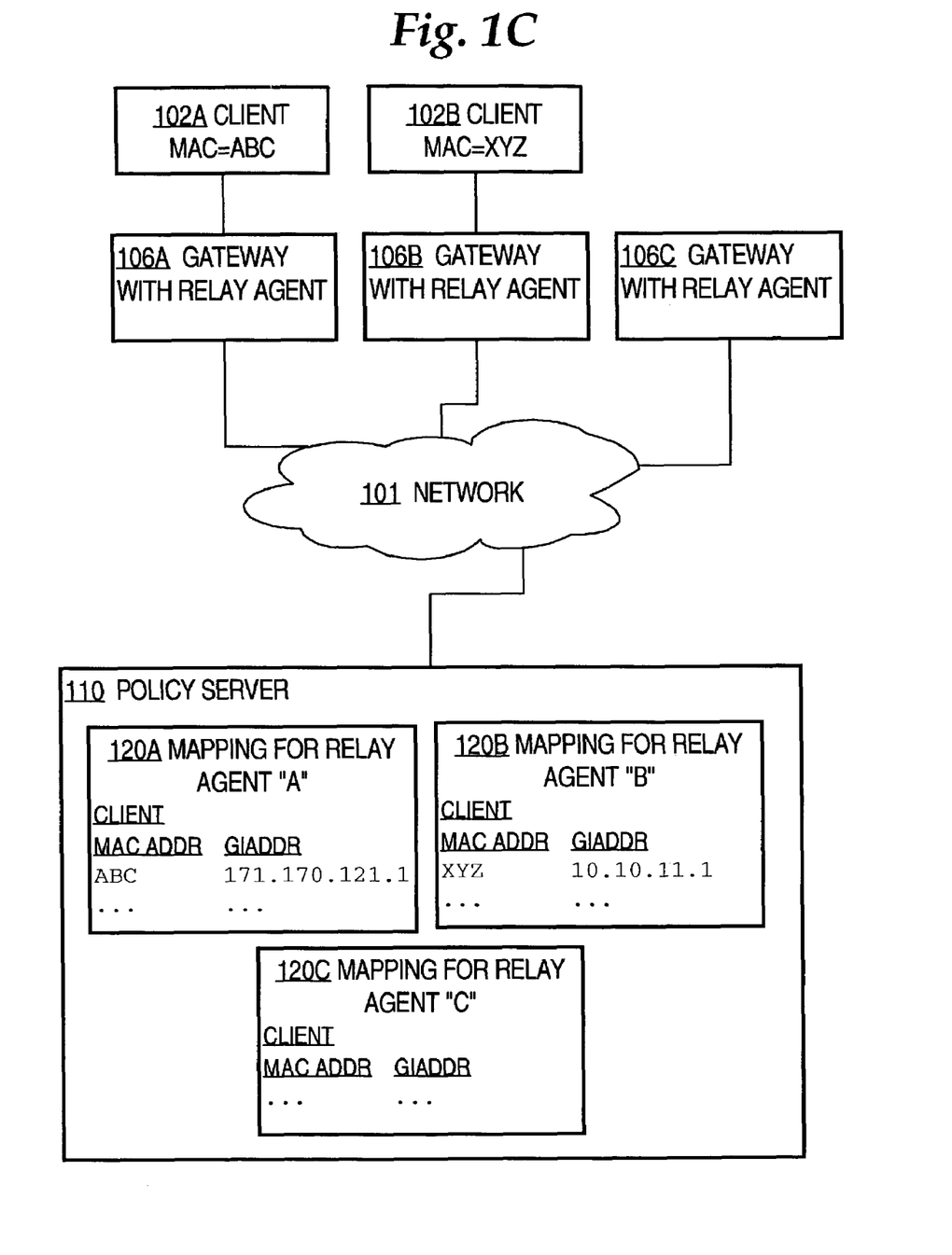
FIG. 1C is a block diagram of an alternative mapping approach.

Alternatively, as shown in FIG. 1C, each of a plurality of mappings 120A, 120B, 120C maps client control addresses (such as MAC addresses) to specific scope values (such as "giaddr" values). Use of the mappings 120A, 120B, 120C is described further below.

In one specific embodiment, the first column of mapping 120 in FIG. 1B stores client MAC addresses and the second column stores scope names. MAC addresses are used because they are relatively static with respect to clients. The scope names identify different abstract scopes that may be selected. For example, a scope name of "public" indicates that for a particular client, a publicly routable network address is selected. In contrast, a scope name of "private" indicates that a private address, of the type normally assigned behind a NAT device, will be selected. Alternatively, the second column of mappings 120A, 120B and 120C in FIG. 1C stores the 'giaddr' of the scope. This eliminates the need for the mapping from scope name to "giaddr" in the DHCP relay agents (e.g., mappings 130A, 130B of FIG. 1B) but increases the complexity of the configuration of the policy server 110, which now has to be aware of 'giaddr' values.

In FIG. 1B, gateways 106A, 106B maintain respective mappings 130A, 130B of scope identifiers to request source addresses. An example of a scope identifier is a scope name. An example of a request source address is a "giaddr" value. For example, the scope name "Public" may be associated with one "giaddr" value, and the scope "Private" may be mapped to a different "giaddr" value. Alternatively, mappings 130A, 130B may map scope names to pointers or indices into a table of "giaddr" values. A gateway 106 may cache the association between client MAC addresses and scopes so that each DHCP request does not result in a request to the policy server 110.

In one embodiment, the MAC to scope mapping may be implemented by extending the Address Resolution Protocol (ARP) table of a gateway with an additional column for the scope associated with the MAC address in the ARP table entry. Use of the mappings 120, 130 is described further below. In this embodiment, the ARP table entries are marked as invalid for address resolution until an IP lease is assigned to the client. The gateway may detect this assignment by detecting the DHCPACK from the DHCP server that grants the lease to the client or the first ARP message from the client.

Figure 2:
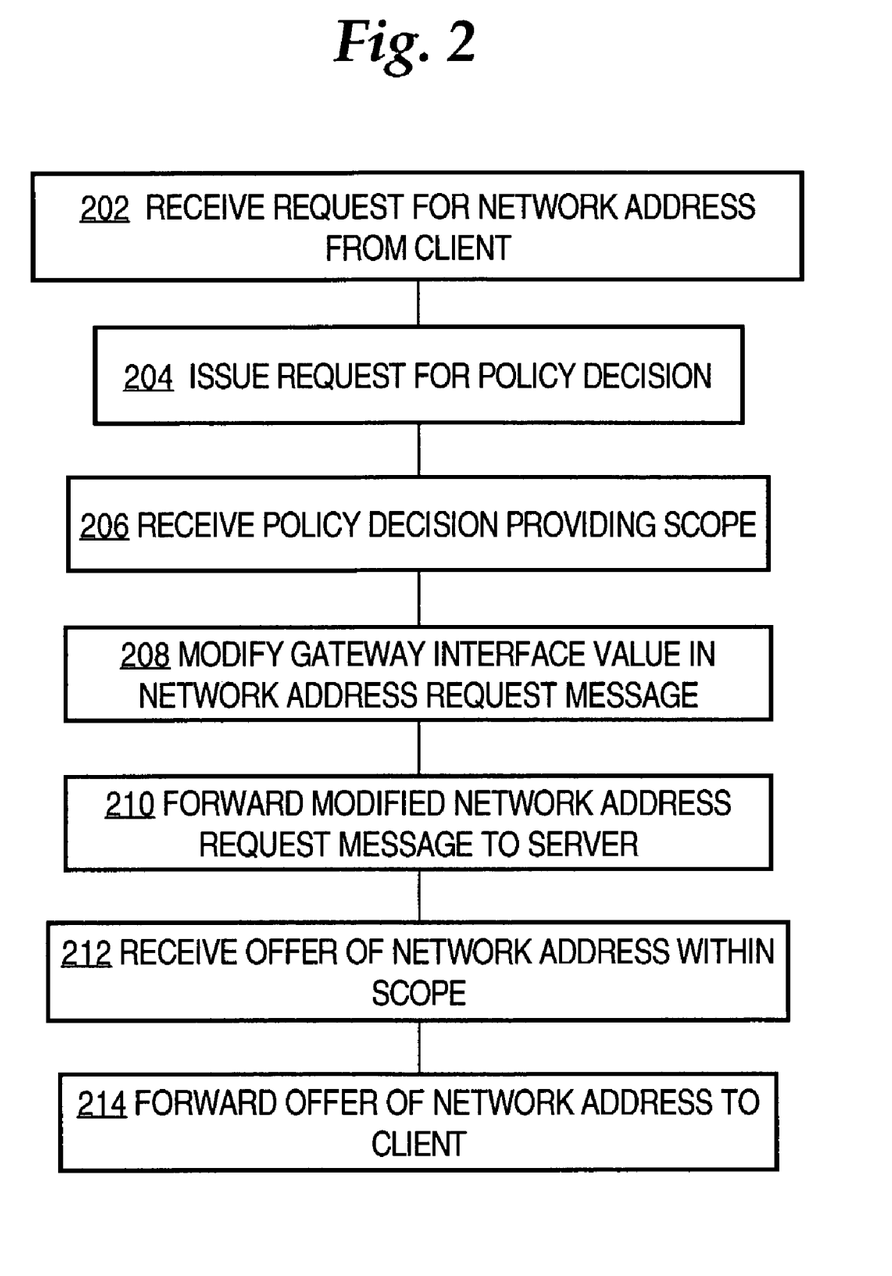
FIG. 2 is a flow diagram that illustrates a high level overview of one embodiment of a method for conserving network addresses.
Figure 3:
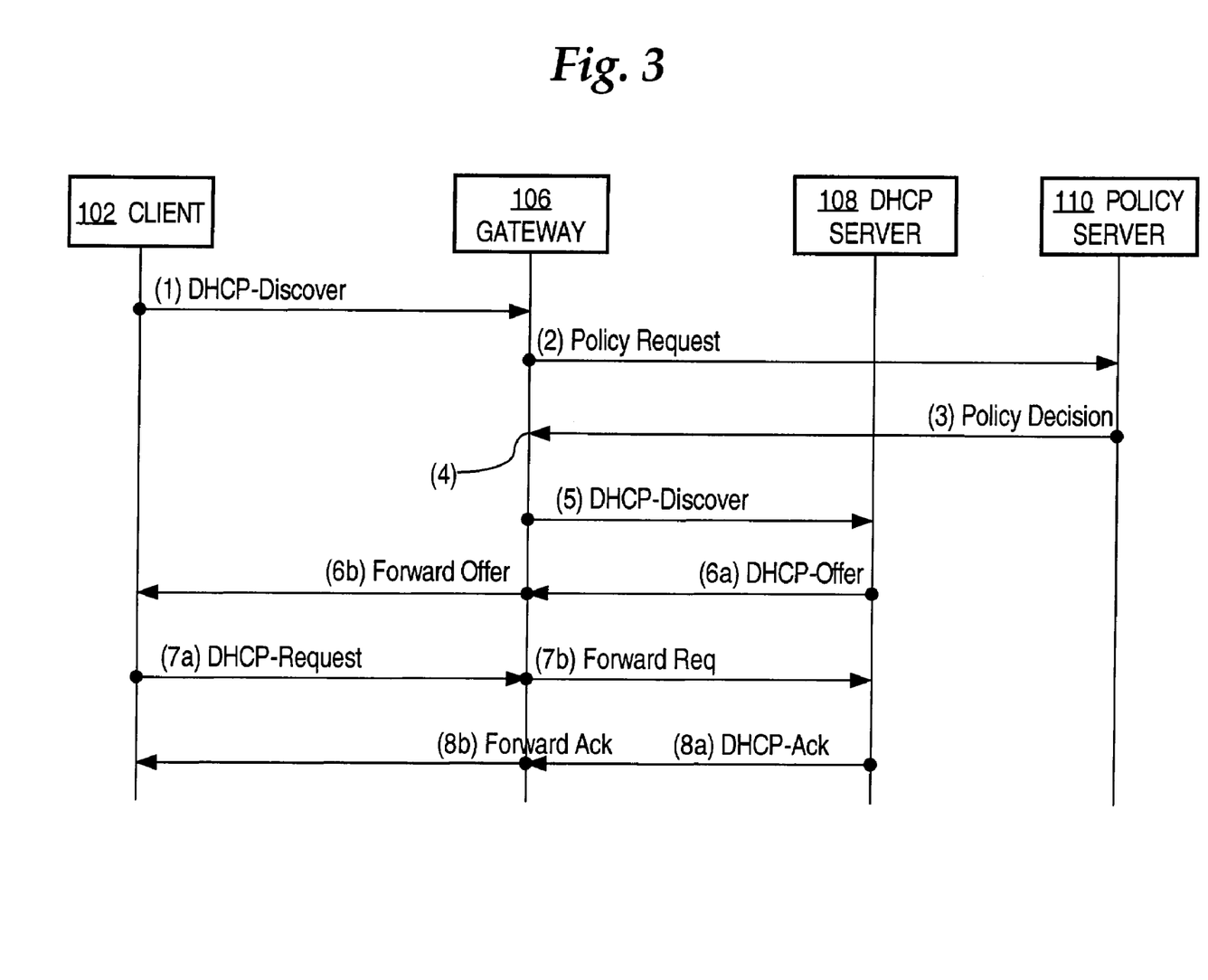
FIG. 3 is a message flow diagram that illustrates a flow of messages among elements of FIG. 1A.

FIG. 2 is a flow diagram that illustrates a high level overview of one embodiment of a method for conserving network addresses. FIG. 3 is a message flow diagram that illustrates a flow of messages among elements of FIG. 1A, FIG. 1B and FIG. 1C. For purposes of illustrating a clear example, the process of FIG. 2 is described herein with respect to the message flow scenario of FIG. 3, and the elements of FIG. 1A, FIG. 1B and FIG. 1C. Further, FIG. 2 is expressed from the standpoint of a gateway, such as gateway 106, or its DHCP relay agent. However, embodiments are not limited to these contexts.

In FIG. 3, messages are represented by horizontal arrows. A message originates from the device to which the circular dot of an arrow is attached, and is sent to the destination device whose vertical line is pointed to by the arrowhead. A device may intercept and modify a message destined for another device. Time increases downward along the vertical axis, such that the earliest messages are at the top of the flow. A label consisting of a message number and brief description appears above each message arrow near the message source.

The diagram of FIG. 3 illustrates a scenario involving a DHCP client using web-based authentication. DHCP messages identified in FIG. 3 generally conform to DHCP as specified in IETF RFC 2131 and 2132. However, embodiments may support other scenarios. For example, the client could be an 802.1X supplicant that authenticates to a wireless access point (not shown in FIG. 3) acting as an 802.1X authenticator. The access point communicates with the policy server, which acts as an 802.1X authentication server via a protocol such as RADIUS. This authentication occurs prior to the client requesting an IP lease via DHCP, so the policy server knows the identity of the user associated with the client and can send scope selection directives to the gateway based on the privileges configured for this user on the policy server.

Referring now to FIG. 2, in block 202, a request for a network address is received from the client. As shown in FIG. 3, in message (1), client 102 initiates a session by sending a DHCPDISCOVER broadcast message into the network, to elicit responses from DHCP servers. In the scenario of FIG. 2 and FIG. 3, it is assumed that DHCP server 108 is located off the network that contains client 102, so the gateway 106 is configured with a DHCP relay agent 106A to relay to the DHCP request to the DHCP server.

In block 204, a request for a policy decision is issued. For example, when gateway 106 receives the DHCPDISCOVER message, the gateway sends policy request message (2) to the policy server 110. The policy request message includes a MAC address of client 102 and information requesting the policy server 110 to determine a network address scope applicable to the client. Gateway 106 may obtain the MAC address of client 102 as part of authenticating the client. For example, client authentication under the IEEE 802.1x protocol involves providing a MAC address.

Any suitable communication protocol may be used for messages that are communicated between the gateway 106 and the policy server 110. For example, XML documents or messages may be used.

Policy server 110 determines what scope is appropriate to use for assigning a network address to client 102. The policy server 110 may determine the appropriate scope by looking up the client MAC address, which was received in message (2), in the mapping 120 (FIG. 1B), 120A, 120B, 120C (FIG. 1C) that is associated with gateway 106, and retrieving the corresponding scope name. Policy server 110 then returns a policy decision message (3) to the gateway 106. The policy decision message (3) contains information identifying the MAC address of client 102, and an instruction to allocate network addresses from a scope having a particular scope name. As stated in block 206 of FIG. 2, the policy decision providing scope is received.

In block 208, a gateway interface value is modified in the network address request message that was received at block 202. Such modification occurs at point (4) of FIG. 3. For example, upon receiving the policy decision message (3) from the policy server 110, gateway 106 modifies the DHCPDISCOVER message (1) that it received from the client by changing the "giaddr" field value in the DHCP DISCOVER message.

In one embodiment, gateway 106 selects a modified value for the "giaddr" field by looking up the scope name, which was received from the policy server in the policy decision message (3), in mapping 130 of scope identifiers to request source address values. For example, the scope name mapping may indicate that a scope name of "Public" corresponds to a particular request source address value, and that a scope name of "Private" is associated with a different request source address value. Use of mapping 130 yields a request source address value that identifies an interface of the gateway, and not a particular client network address. Alternatively, the policy server may provide "giaddr" instead of a scope name. In this case, the mapping 130 from scope name to "giaddr" is not required.

In block 210, the modified network address request message is forwarded to the DHCP server. For example, after modifying the DHCPDISCOVER message as just described, the gateway forwards the DHCPDISCOVER message (5) to the DHCP server 108.

Holding back the DHCPDISCOVER message at the gateway in this manner enables the policy server to influence the assignment of a network address lease by the DHCP server. By inserting one of several 'giaddr' values in the DHCPDISCOVER message at the gateway before the message is forwarded, the policy server indirectly controls the scope from which the DHCP server assigns the network address.

In another approach, the policy server may influence the address assignment by adding RADIUS sub-options to DHCP Relay Option 82. In yet another approach, if communication between the policy server and the DHCP server is available, then the policy server 110 may send a message to the DHCP server 108 to request a reservation for the MAC address reported in the policy request message (2

In yet another alternative approach, if gateway 106 has insufficient resources available to hold the DHCPDISCOVER message as just described, the gateway may drop packets of DHCPDISCOVER message (1) until the policy decision message (3) arrives, and rely on retry logic in client 102 to retransmit the DHCPDISCOVER request.

If the policy server 110 fails to respond to policy request message (2), then in one approach, gateway 106 allows DHCPDISCOVER requests to pass through to DHCP server 108. This enables client 102, and other clients on a network that contains the client, switch 104, and gateway 106, to receive network address leases even if the policy server 110 is down. In still other embodiments, the gateway is configurable not to await policy decisions on DHCP leases.

In block 212, an offer of a lease for a network address within the scope is received. For example, in FIG. 3, a DHCPOFFER message (6a) is received from DHCP server 108 at gateway 106. The gateway then forwards the offer message to the client, as indicated by message (6b), and block 214 of FIG. 2. The client 102 may have received more than one offer; a DHCP client executed by client 102 then selects one of the offers. Client 102 requests a selected offered lease in a DHCPREQUEST message (7a).

Gateway 106 again modifies the "giaddr" value of message 8a to reference the gateway, and forwards the request message to DHCP server 108 in DHCPREQUEST message (7b). The DHCP server 108 confirms the lease by sending an acknowledgement message (8a) to the gateway interface address indicated by the "giaddr" field in the DHCPREQUEST message (7b). The gateway 106 forwards the acknowledgment to client 102, as indicated by message (8b). At this point, the client 102 has a lease for a specific network address, within a scope that was dictated by the policy server 110.

To support messages (6a) through (8b), inclusive, in certain embodiments, the scope associated with a MAC address is cached in the ARP table. In these embodiments, a policy can be configured on the inside interface of the gateway 106 to lock the ARP cache of switch 104, which maps the client MAC address to the IP address assigned in the lease, for the duration of the lease. This mapping persists until the lease expires, or until the client issues a DHCPRE- LEASE message (not shown). The locking step prevents spoofing of IP address values in the cache.

In certain embodiments, receiving the DHCPACK message (9a) may cause the gateway to perform storage reclamation with respect to the mappings described above. If the gateway discards the MAC to scope mapping, it must send a policy request to obtain the scope associated with a MAC address when client renews its address lease.

Figure 1D:
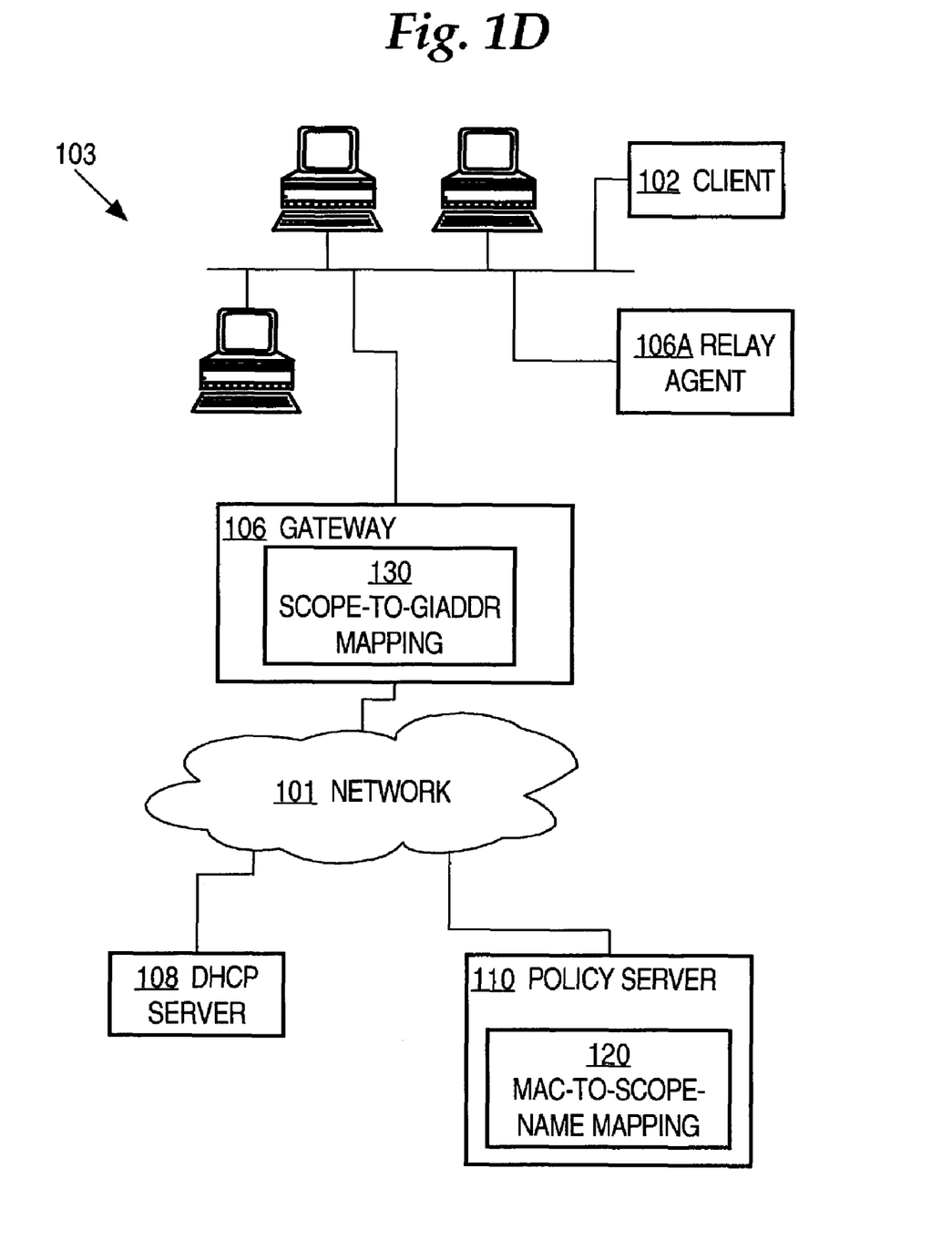
FIG. 1D is a block diagram of an alternative network arrangement in which a relay agent and gateway are hosted on separate network devices.

Embodiments of the processes described above may be implemented at a gateway, DHCP relay agent, policy server, or any other suitable location, using one or more computer programs or other logical elements implemented in software, firmware, hardware, or a combination thereof. For example, it is possible, but unusual, for the gateway and the DHCP relay agent to be on separate devices, both connected to the clients' network. Such an arrangement is illustrated in FIG. 1D. In such a configuration, client 102 communicates with DHCP relay agent 106A, and the DHCP relay agent exchanges messages with DHCP server 108 through gateway 106. If the processes are implemented at the policy server, then the policy server can also make and communicate policy-based packet routing decisions; indeed, selection of a network address is a form of policy decision. No direction communication occurs between the policy server and DHCP server. The processes described above can interoperate with conventional DHCP servers without modification of the servers, and without use of DHCP Option 82 for scope selection, which not all DHCP servers support.

3.0 Implementation Mechanisms—Hardware Overview

Figure 4:
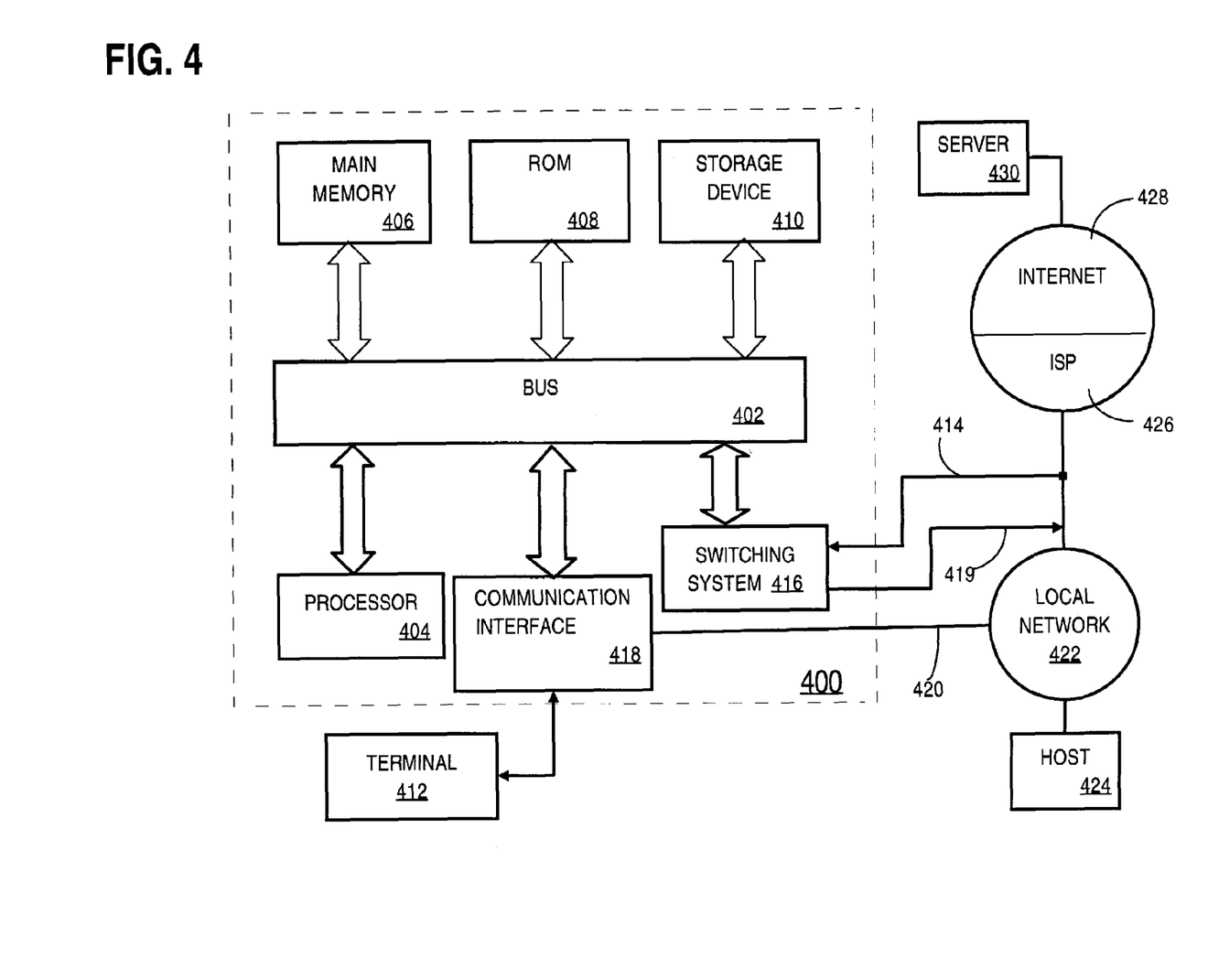
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for specifying a network address scope by manipulating a gateway address value. According to one embodiment of the invention, specifying a network address scope by manipulating a gateway address value is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for specifying a network address scope by manipulating a gateway address value as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of policy-based determination of a network address for a client in a network that includes a gateway, the method comprising the computer-implemented steps of:
receiving, from the client, a request to assign a network address to the client;
sending to a policy server a policy decision request comprising a MAC address of the client and information requesting the policy server to determine a network address scope applicable to the client;
receiving a policy response that identifies the address scope of network addresses for the client;
modifying a request source address value in the client request based on the policy response;
sending the modified client request to a server that can assign network addresses within the identified scope;
receiving a network address for the client that has been assigned by the server within the identified scope;
in response to receiving the policy response, caching, at the gateway, the scope of network addresses for the client from the policy response in association with a media access control (MAC) address of the client;
providing the network address to the client; and
modifying a second request source address value in a second request for a network address from the client without requesting a policy response.

2. A method as recited in claim 1, wherein the client request is a Dynamic Host Control Protocol (DHCP) request.

3. A method as recited in claim 1, wherein the client request is a Dynamic Host Control Protocol (DHCP) request, and wherein the request source address is a "giaddr" field value in the DHCP request.

4. A method as recited in claim 1, wherein the step of receiving a policy response further comprises the steps of:
sending a policy request to determine a scope of network addresses for the client, wherein the policy request includes a client control address that is uniquely associated with the client;
receiving a policy response that identifies a scope of network addresses for the client.

5. A method as recited in claim 1, wherein the step of receiving a policy response further comprises the steps of:
sending a policy request to determine an address scope of network addresses for the client, wherein the policy request includes a client control address that is uniquely associated with the client;
receiving a policy response that identifies an address scope of network addresses for the client, wherein the policy response is based on a first mapping of client control addresses to scope identifiers.

6. A method as recited in claim 5, wherein the step of modifying a request source address value in the client request based on the policy response further comprises the steps of:
looking up an identifier of the scope in a second mapping of scope identifiers to request source address values;
selecting, from the second mapping, a request source address value that corresponds to the scope identifier.

7. A method as recited in claim 1, further comprising the steps of:
creating and storing a mapping of network address values to scope at a DHCP relay agent;
creating and storing a mapping of client control addresses to scope at the DHCP relay agent.

8. A method as recited in claim 3, wherein the mapping of client control addresses to scope is stored in a column of an Address Resolution Protocol (ARP) table, and wherein an entry in the ARP table is marked invalid for purposes of address resolution until a network address is assigned to the client.

9. A method of dynamically assigning an Internet Protocol (IP) address to a client that participates in a network having a gateway, a DHCP relay agent and a Dynamic Host Control Protocol (DHCP) server, the method comprising the computer-implemented steps of:
receiving from the client, a DHCP Discover message;
sending to a policy server a policy request message, wherein the policy request message includes a media access control (MAC) address of the client and information requesting the policy server to determine a network address scope applicable to the client;

receiving, from the policy server, a policy response, wherein the policy response includes the address scope;

in response to receiving the policy response, caching, at the gateway, the address scope in association with the media access control (MAC) address of the client;

modifying a gateway interface address ("giaddr") value in the client request based on the address scope;

forwarding the modified client request to the DHCP server;

receiving a DHCP offer message from the DHCP server that offers an address that is within a scope associated with the address scope;

forwarding the offer message to the client; and modifying a second giaddr value in a second DHCP Discover message from the client without requesting a policy response.

10. A method of dynamically assigning an Internet Protocol (IP) address to a client that participates in a network having a gateway, a DHCP relay agent and a Dynamic Host Control Protocol (DHCP) server, the method comprising the computer-implemented steps of:

receiving from the client at the DHCP relay agent, a DHCP Discover message;

receiving from the DHCP relay agent at the gateway, the DHCP Discover message destined for the DHCP server;

sending from the gateway a policy request message to a policy server in the network, wherein the policy request message includes a media access control (MAC) address of the client and information requesting the policy server to determine a network address scope applicable to the client;

receiving at the gateway, a policy response from the policy server, wherein the policy response includes the address scope;

in response to receiving the policy response, caching, at the gateway, the address scope in association with the media access control (MAC) address of the client;

modifying at the gateway, a gateway interface address ("giaddr") value in the client request based on the address scope;

forwarding the modified client request to the DHCP server;

receiving at the DHCP relay agent via the gateway a DHCP offer message from the DHCP server that offers an address that is within a scope associated with the address scope;

forwarding the offer message to the client; and modifying a second giaddr value in a second DHCP Discover message from the client without requesting a policy response.

11. A method as recited in claim 10, wherein the step of receiving a policy response further comprises the steps of:

sending, to the policy server, a policy request to determine an address scope of network addresses for the client, wherein the policy request includes a MAC address that is uniquely associated with the client;

receiving, from the policy server, a policy response that identifies an address scope of network addresses for the client, wherein the policy response is based on a first mapping of MAC addresses to scope identifiers.

12. A method of dynamically assigning an Internet Protocol (IP) address to a client that participates in a network having a gateway, a DHCP relay agent and a Dynamic Host Control Protocol (DHCP) server, the method comprising the computer-implemented steps of:

receiving, from the client, a DHCP Discover message;

sending, to a policy server, a policy request to determine a scope of network addresses for the client, wherein the policy request message includes a media access control (MAC) address of the client and information requesting the policy server to determine a network address scope applicable to the client;

receiving, from the policy server, a policy response that includes an address scope identifier that identifies the network address scope applicable to the client, wherein the policy response is based on a first mapping of MAC addresses to scope identifiers;

in response to receiving the policy response, caching, at the gateway, the scope of network addresses for the client in association with the media access control (MAC) address of the client;

looking up an identifier of the scope in a second mapping of scope names to gateway interface address values;

selecting, from the second mapping, a gateway interface address value that corresponds to the scope identifier;

modifying the client request to include the selected gateway interface address value;

forwarding the modified client request to the DHCP server;

receiving a DHCP offer message from the DHCP server that offers an address that is within a scope associated with the address scope identifier;

forwarding the offer message to the client; and modifying a second client request to include the selected gateway interface address value without requesting a policy response.

13. A computer-readable storage medium carrying one or more sequences of instructions for policy-based determination of a network address for a client in a network that has a gateway, which instructions, when executed by one or more processors, cause the one or more processors to carry out the steps of:

receiving, from the client, a request to assign a network address to the client;

sending to a policy server a policy decision request comprising a MAC address of the client and information requesting the policy server to determine a network address scope applicable to the client;

receiving a policy response that identifies the address scope of network addresses for the client;

in response to receiving the policy response, caching, at the gateway, the scope of network addresses for the client in association with the media access control (MAC) address of the client;

modifying a request source address value in the client request based on the policy response;

sending the modified client request to a server that can assign network addresses within the identified scope;

receiving a network address for the client that has been assigned by the server within the identified scope;

providing the network address to the client; and modifying a second request source address value in a second request for a network address from the client without requesting a policy response.

14. A computer-readable storage medium as recited in claim 13, wherein the client request is a Dynamic Host Control Protocol (DHCP) request.

15. A computer-readable storage medium as recited in claim 13, wherein the client request is a Dynamic Host Control Protocol (DHCP) request, and wherein the request source address is a "giaddr" field value in the DHCP request.

16. A computer-readable storage medium as recited in claim 13, wherein the step of receiving a policy response further comprises the steps of:
  sending a policy request to determine a scope of network addresses for the client, wherein the policy request includes a client control address that is uniquely associated with the client;
  receiving a policy response that identifies a scope of network addresses for the client.

17. A computer-readable storage medium as recited in claim 13, wherein the step of receiving a policy response further comprises the steps of:
  sending a policy request to determine an address scope of network addresses for the client, wherein the policy request includes a client control address that is uniquely associated with the client;
  receiving a policy response that identifies an address scope of network addresses for the client, wherein the policy response is based on a first mapping of client control addresses to scope identifiers.

18. A computer-readable storage medium as recited in claim 17, wherein the step of modifying a request source address value in the client request based on the policy response further comprises the steps of:
  looking up an identifier of the scope in a second mapping of scope identifiers to request source address values;
  selecting, from the second mapping, a request source address value that corresponds to the scope identifier.

19. A computer-readable storage medium as recited in claim 13, further comprising the steps of:
  creating and storing a mapping of network address values to scope at a DHCP relay agent;
  creating and storing a mapping of client control addresses to scope at the DHCP relay agent.

20. A computer-readable storage medium as recited in claim 19, wherein the mapping of client control addresses to scope is stored in a column of an Address Resolution Protocol (ARP) table, and wherein an entry in the ARP table is marked invalid for purposes of address resolution until a network address is assigned to the client.

21. An apparatus for policy-based determination of a network address for a client in a network that has a gateway, comprising:
  means for receiving, from the client, a request to assign a network address to the client;
  means for sending to a policy server a policy decision request comprising a MAC address of the client and information requesting the policy server to determine a network address scope applicable to the client;
  means for receiving a policy response that identifies the address scope of network addresses for the client;
  means for caching, at the gateway, the scope of network addresses for the client in association with the media access control (MAC) address of the client, in response to the means for receiving the policy response;
  means for modifying a request source address value in the client request based on the policy response;
  means for sending the modified client request to a server that can assign network addresses within the identified scope;
  means for receiving a network address for the client that has been assigned by the server within the identified scope;
  means for providing the network address to the client; and
  means for modifying a second request source address value in a second request for a network address from the client without requesting a policy response.

22. An apparatus as recited in claim 21, wherein the client request is a Dynamic Host Control Protocol (DHCP) request.

23. An apparatus as recited in claim 21, wherein the client request is a Dynamic Host Control Protocol (DHCP) request, and wherein the request source address is a "giaddr" field value in the DHCP request.

24. An apparatus as recited in claim 21, wherein the means for receiving a policy response further comprises:
  means for sending a policy request to determine a scope of network addresses for the client, wherein the policy request includes a client control address that is uniquely associated with the client;
  means for receiving a policy response that identifies a scope of network addresses for the client.

25. An apparatus as recited in claim 21, wherein the means for receiving a policy response further comprises:
  means for sending a policy request to determine an address scope of network addresses for the client, wherein the policy request includes a client control address that is uniquely associated with the client;
  means for receiving a policy response that identifies an address scope of network addresses for the client, wherein the policy response is based on a first mapping of client control addresses to scope identifiers.

26. An apparatus as recited in claim 25, wherein the means for modifying a request source address value in the client request based on the policy response further comprises:
  means for looking up an identifier of the scope in a second mapping of scope identifiers to request source address values;
  means for selecting, from the second mapping, a request source address value that corresponds to the scope identifier.

27. An apparatus as recited in claim 21, further comprising:
  means for creating and storing a mapping of network address values to scope at a DHCP relay agent;
  means for creating and storing a mapping of client control addresses to scope at the DHCP relay agent.

28. An apparatus as recited in claim 27, wherein the mapping of client control addresses to scope is stored in a column of an Address Resolution Protocol (ARP) table, and wherein an entry in the ARP table is marked invalid for purposes of address resolution until a network address is assigned to the client.

29. An apparatus for policy-based determination of a network address for a client in a network that has a gateway, comprising:
  a network interface that is coupled to the data network for receiving one or more packet flows therefrom;
  a processor;
  one or more stored sequences of instructions which, when executed by the processor, cause the processor to carry out the steps of:
    receiving, from the client, a request to assign a network address to the client;
    sending to a policy server a policy decision request comprising a MAC address of the client and information requesting the policy server to determine a network address scope applicable to the client;
    receiving a policy response that identifies the address scope of network addresses for the client;
    in response to receiving the policy response, caching, at the gateway, the scope of network addresses for the client in association with the media access control (MAC) address of the client;

modifying a request source address value in the client request based on the policy response;

sending the modified client request to a server that can assign network addresses within the identified scope;

receiving a network address for the client that has been assigned by the server within the identified scope;

providing the network address to the client; and modifying a second request source address value in a second request of a network address from the client without requesting a policy response.

30. An apparatus as recited in claim 29, wherein the client request is a Dynamic Host Control Protocol (DHCP) request.

31. An apparatus as recited in claim 29, wherein the client request is a Dynamic Host Control Protocol (DHCP) request, and wherein the request source address is a "giaddr" field value in the DHCP request.

32. An apparatus as recited in claim 29, wherein the step of receiving a policy response further comprises the steps of:

sending a policy request to determine a scope of network addresses for the client, wherein the policy request includes a client control address that is uniquely associated with the client;

receiving a policy response that identifies a scope of network addresses for the client.

33. An apparatus as recited in claim 29, wherein the step of receiving a policy response further comprises the steps of:

sending a policy request to determine an address scope of network addresses for the client, wherein the policy request includes a client control address that is uniquely associated with the client;

receiving a policy response that identifies an address scope of network addresses for the client, wherein the policy response is based on a first mapping of client control addresses to scope identifiers.

34. An apparatus as recited in claim 33, wherein the step of modifying a request source address value in the client request based on the policy response further comprises the steps of:

looking up an identifier of the scope in a second mapping of scope identifiers to request source address values;

selecting, from the second mapping, a request source address value that corresponds to the scope identifier.

35. An apparatus as recited in claim 29, further comprising the steps of:

creating and storing a mapping of network address values to scope at a DHCP relay agent;

creating and storing a mapping of client control addresses to scope at the DHCP relay agent.

36. An apparatus as recited in claim 35, wherein the mapping of client control addresses to scope is stored in a column of an Address Resolution Protocol (ARP) table, and wherein an entry in the ARP table is marked invalid for purposes of address resolution until a network address is assigned to the client.

* * * * *